Sept 17, 1957     W. SINDZINSKI     2,806,582
CO-ACTING BELT CONVEYOR SYSTEM
Filed Dec. 9, 1953
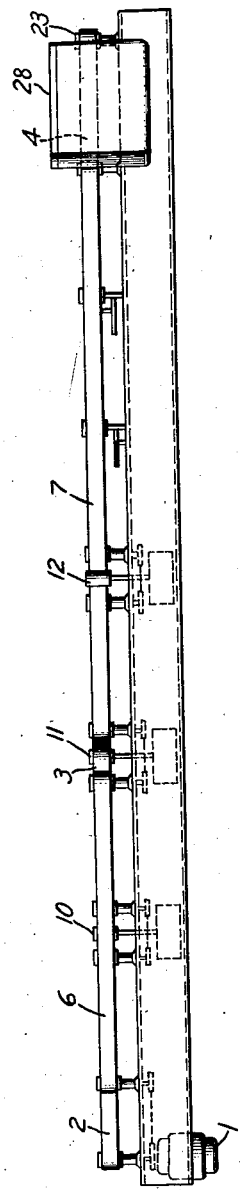
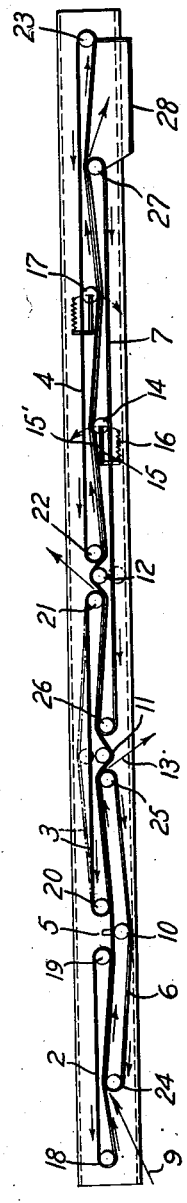
INVENTOR
WILLY SINDZINSKI
BY
ATTORNEY ※ 2,806,582
Patented Sept. 17, 1957

2,806,582
CO-ACTING BELT CONVEYOR SYSTEM

Willy Sindzinski, Berlin, Germany, assignor to International Standard Electric Corporation, New York, N. Y., a corporation of Delaware Application December 9, 1953, Serial No. 397,106

Claims priority, application Germany December 11, 1952

3 Claims. (Cl. 198—165)

This invention relates to conveyor systems in which articles carried by the system may be ejected at certain predetermined points under the control of electrically or mechanically operated devices. In certain systems it is known that the articles carried are frequently displaced longitudinally of the conveying means, this displacement being known as a slippage, which is sometimes caused by friction between the moving article and the guiding means which keep it in its proper path. In certain instances dispatched articles may even be deformed, torn or otherwise damaged by slippage.

Systems adapted to overcome this deficiency have become known wherein the dispatched articles are conveyed by being clamped between two conveyer belts. One such system is designed with a first conveyer belt extending from one operating point to the next, this belt being capable, with an associated opposed belt, of conveying an article that has been placed between the belts at one operating point to a second operating point where the article will be ejected or dropped out because of the space between the end of the first conveyer belt and the beginning of a second conveyer belt extending from said second operating point to a third operating point. This system thus permits articles put into the conveyor at one operating point to be discharged at the next operating point but does not permit the passage of the article beyond such operating point to a third operating point.

In accordance with the present invention a conveyer system is provided in which articles to be conveyed are clamped between opposed conveyer belts which are arranged to permit the discharge of the conveyed articles at any one of several points along the conveying path. Specifically this result is achieved by the provision of two rows of conveyer belts, each row consisting of a plurality of belts one after the other, the several belts in one row being staggered with respect to those in the other in an overlapping relationship, the space between the successive belts in one row being such that an article being conveyed will normally pass out of contact with one conveyer belt only after it has been seized by the next conveyer belt in the series.

In accordance with the invention, conveyed articles are dispatched at any desired one of the spaces between consecutive conveyer belts in one of the rows by deflecting towards the space between the said consecutive conveyer belts, the opposed conveyer belt which overlaps the successive belts just mentioned. In this way an article being carried by the conveyer will, after reaching the end of the first conveyer belt, be deflected out of contact with the next conveyer belt and so be caused to be ejected or dropped from the conveyer. The deflection of the overlapping belt to cause the discharge of the article may be carried out by means of a mechanically or electro-mechanically displaced roller.

It will be seen that in accordance with the invention because of the use of opposed belts the conveyed article is free from slippage and, on the other hand, it is possible to eject the article from the conveyer system at any one of several desired positions or to permit it to go through the entire conveyer system from one end to the other.

The invention will be better understood from the following description taken in conjunction with the drawings, wherein Fig. 1 shows a bottom view of a conveyer system in accordance with the invention;

Fig. 2 shows the same system in side elevation.

Referring more particularly to Fig. 1, reference numeral 1 indicates a driving motor driving directly a conveyer belt 2 running on pulleys 18 and 19 and likewise driving through any suitable means, not shown, conveyer belt 3 and the other belts of the system running on pulleys 20, 21, 22, 23, 24, 25, 26 and 27. As shown in Fig. 2 there is a first series of conveyer belts 2, 3 and 4 spaced from one another as illustrated for example at 5. A second series of conveyer belts 6 and 7 are placed in generally parallel, overlapping relation with respect to the belts 2, 3 and 4, belt 6 being close to or in contact with belts 2 and 3 and their contacting surfaces moving in the same direction so that an article to be conveyed, introduced into the system at 9, will be clamped between the belts 2 and 6 and be moved by them normally and with sufficient velocity directly across the space 5 whereupon the article will be seized by belts 3 and 6 and carried further through the system. If the length of the article conveyed is longer than the space 5, the belt system may operate at lower speed since the belts 3 and 6 will grip the leading edge of the article before the trailing edge thereof shall have passed from the grip of belts 2 and 6.

In order to eject a conveyed article from the conveyer system at any one of several desired points, displaceable rollers 10, 11 and 12 are provided. These are adapted for movement, by any suitable mechanical or electromechanical means, in a direction generally at right angles to the path of travel of an article through the conveyer system, to a position between the ends of the two adjacent conveyer belts. The roller 10 is shown in its normal position for straight through passage of a conveyed article while rollers 11 and 12 are shown in their displaced positions to effect ejection of an article as it reaches these rollers.

Tracing the passage of a conveyed article from point 9, it will be seen that it is carried along between belts 2 and 6 and, being undeflected by roller 10, bridges the gap 5 and is moved further along its path by belts 3 and 6 until it reaches the roller 11 which, being displaced into a position between ends of adjacent belts 6 and 7, causes the belt 3 and the article carried by it to be deflected downwardly, the article being dropped out or ejected in the direction shown by arrow 13. If the roller 11 had, however, been in its normal, undisplaced, position as shown by the dotted circle, the article would have been passed from belts 3 and 6 to belts 3 and 7 and been carried along until ejected from the conveyor by the deflection of belt 7 under control of roller 12.

Reference numeral 14 indicates a take-up roller carried by a lever arm 15 mounted on pivot 15' and pressed against belts 4 and 7 by action of spring 16. This roller or idler pulley gives the conveyor system greater flexibility by permitting the conveyance of larger articles and at the same time compensating for variation in the length of the belts. Numeral 17 indicates a second spring pressed take-up roller. Any conveyed articles that are not dispatched by operation of rollers 10, 11 or 12 are finally discharged at the end of the conveyer into a tray 28.

While I have described above the principles of my invention in connection with specific apparatus, it is to be clearly understood that this description is made only by way of example and not as a limitation to the scope of my invention.

What is claimed is:

1. A delivery arrangement for a conveyer system, of the type in which conveyed articles are clamped between moving belts, comprising a first and a second belt disposed one after the other and separated by a certain space, a third belt generally parallel to and overlapping said first and second belts and bridging said space, means for driving said belts to convey an article held between them and across said space, a roller mounted for contact with said third belt at a point adjacent to said space and means for deflecting said roller to move said third belt into said space to cause an article carried by said conveyer to be ejected therefrom at said space.

2. A delivery arrangement for a conveyer system, of the type in which conveyed articles are clamped between moving belts, comprising a first series of belts arranged one after the other with spaces between their neighboring ends, a second, similar, series of belts disposed generally parallel to said first series and overlapping same but displaced longitudinally there to so that said spaces first mentioned appear intermediate the ends of adjacent belts in said second series, means for driving the belts of both said series to convey an article held between them and across said spaces, a roller in contact with said adjacent belt, and means for moving said roller and belt into one of said spaces to cause articles in the conveyer to be ejected therefrom at said space.

3. A conveyer system, according to the preceding claim, wherein an idler roller is held in contact with said belts intermediate the ends of the conveying portions thereof to maintain said belts in a predetermined position.

References Cited in the file of this patent
UNITED STATES PATENTS 1,858,416     Rapley _____ May 17, 1932